US012513450B2

(12) United States Patent
Schoerkmaier

(10) Patent No.: US 12,513,450 B2
(45) Date of Patent: Dec. 30, 2025

(54) ACTIVE LEAKAGE ADAPTION FOR WEARABLE AUDIO DEVICES

(71) Applicant: Bang & Olufsen A/S, Struer (DK)

(72) Inventor: Martin Schoerkmaier, Stattegg (AT)

(73) Assignee: Bang & Olufsen A/S, Struer (DK)

(*) Notice: Subject to any disclaimer, the term of this patent is extended or adjusted under 35 U.S.C. 154(b) by 202 days.

(21) Appl. No.: 18/331,590

(22) Filed: Jun. 8, 2023

(65) Prior Publication Data

US 2024/0305923 A1 Sep. 12, 2024

(30) Foreign Application Priority Data

Mar. 10, 2023 (DK) ........................... PA 2023 00218

(51) Int. Cl.
*H04R 1/10* (2006.01)
*G10K 11/178* (2006.01)
*H04R 1/28* (2006.01)

(52) U.S. Cl.
CPC ..... *H04R 1/1083* (2013.01); *G10K 11/17881* (2018.01); *H04R 1/2846* (2013.01); *G10K 2210/1081* (2013.01); *H04R 2460/01* (2013.01); *H04R 2460/11* (2013.01)

(58) Field of Classification Search
CPC ........... G10K 11/161; G10K 11/17885; G10K 11/17837
See application file for complete search history.

(56) References Cited

U.S. PATENT DOCUMENTS

2001/0046304 A1* 11/2001 Rast ..................... H04R 1/1083 381/26
2014/0169579 A1 6/2014 Azmi

FOREIGN PATENT DOCUMENTS

CN 111295707 A * 6/2020 ....... G10K 11/17813
CN 113840202 A 12/2021

* cited by examiner

*Primary Examiner* — Kile O Blair
(74) *Attorney, Agent, or Firm* — Patterson + Sheridan, LLP

(57) ABSTRACT

A wearable audio device can include at least one speaker; a first sensor configured to sense sound related to the at least one speaker and provide a first sensor signal; a second sensor configured to sense sound external to the wearable device and provide a second sensor signal; active noise cancellation (ANC) circuitry configured to provide at least a third signal and fourth signal, wherein the third signal is a music compensated first sensor signal and the fourth signal is an ANC signal; at least one active vent; and at least one processor configured to: receive the first sensor signal, the second sensor signal, the third signal and the fourth signal to determine whether a trigger threshold is met, and if the trigger threshold is met, send a control signal to the at least one active vent to cause the at least one active vent to open or close.

20 Claims, 5 Drawing Sheets

ACTIVE LEAKAGE ADAPTION FOR WEARABLE AUDIO DEVICES

PRIORITY CLAIM

The present application claims priority to Denmark Provisional Application No. PA 2023 00218, filed Mar. 10, 2023, which is hereby fully incorporated herein by reference.

TECHNICAL FIELD

Embodiments of the present disclosure relate generally to wearable audio devices such as headphones and earphones, and more particularly to systems and methods for active leakage adaption in wearable audio devices based on activity and scene classification.

BACKGROUND

Electronic audio devices, in particular wearable audio devices like headphones and earbuds, typically must balance various features, including whether they are small, sleek, and aesthetically pleasing, or acoustically superior. A current acoustic feature that many users prefer is active noise cancellation (ANC) where outside noises are effectively "canceled", or transparency mode to render an electronic audio device acoustically "invisible" and enable normal hearing of the outside world while wearing the headset.

Wearable electronic audio devices that offer ANC can enhance the user experience by reducing background noises that can interfere with the listening experience. ANC circuitry typically works by sensing and classifying background sounds in designated frequency ranges and attempting to cancel or suppress these sounds by causing the speakers to vibrate in opposition to the frequencies of the background sounds, thereby reducing or cancelling out the background sounds.

Such cancellation, however, may have the unintended effect of causing sharp, sometimes painful sounds perceived by the user, which can be exacerbated by the sound of the speakers in wearable devices as, generally, the bigger the speaker is, the more proficient the speaker is at producing high quality sound pressure. However, larger speakers conflict with the needs of wearable audio devices, where such devices focus on small, sleek design that is convenient and comfortable for users to wear.

To be able to provide smaller, sleeker electronic audio devices, small speakers are used that significantly lack acoustic power at lower frequencies. Conventionally, such a drawback is compensated by using a strongly sealed design towards the eardrum so that the speaker can operate in a pressure chamber created between the speaker membrane and the eardrum of the user. For the user, closed designs have the benefit of strong passive attenuation against environmental background noise, but at a cost. Closed electronic audio devices are extremely sensitive to vibrational pressures, including natural movement such walking, running, tapping on the device to select settings, or even talking and movements of the jaw. These varying degrees of movement can each cause unpleasant pressure peaks in the ear drum of the user.

Accordingly, a need in the industry remains to provide users with wearable audio devices that are both sleek in design and acoustically excellent.

SUMMARY

Various embodiments of the present disclosure aim to address the above problems.

In an embodiment, a wearable audio device comprises at least one speaker; a first sensor configured to sense sound related to the at least one speaker and provide a first sensor signal; a second sensor configured to sense sound external to the wearable device and provide a second sensor signal; active noise cancellation (ANC) circuitry configured to provide at least a third signal and fourth signal, wherein the third signal is a music compensated first sensor signal and the fourth signal is an ANC signal; at least one active vent; and at least one processor configured to receive the first sensor signal, the second sensor signal, the third signal and the fourth signal to determine whether a trigger threshold is met, and if the trigger threshold is met, send a control signal to the at least one active vent to cause the at least one active vent to open or close.

In another embodiment, a method for dynamically regulating active leakage in a wearable audio device comprises providing at least one active vent near a speaker in the wearable audio device; providing at least one sensor and circuitry in the wearable audio device that are arranged to provide at least one output signal related to sound sensed related to the at least one speaker or sound sensed external to the wearable audio device; and providing at least one processor configured to control an opening or a closing of the at least one active vent based on the at least one output signal.

In yet another embodiment, an audio device comprises at least one speaker; at least one sensor configured to sense sound related to the at least one speaker and to sense sound external to the wearable device and provide at least one sensor signal; active noise cancellation (ANC) circuitry configured to provide at least one ANC signal related to at least one of the sensed sound related to the at least one speaker or the sensed sound external to the wearable device; at least one active vent; and at least one processor configured to control an opening or a closing of the at least one active vent based on the at least one sensor signal and the at least one ANC signal.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figures 1A, 1B:
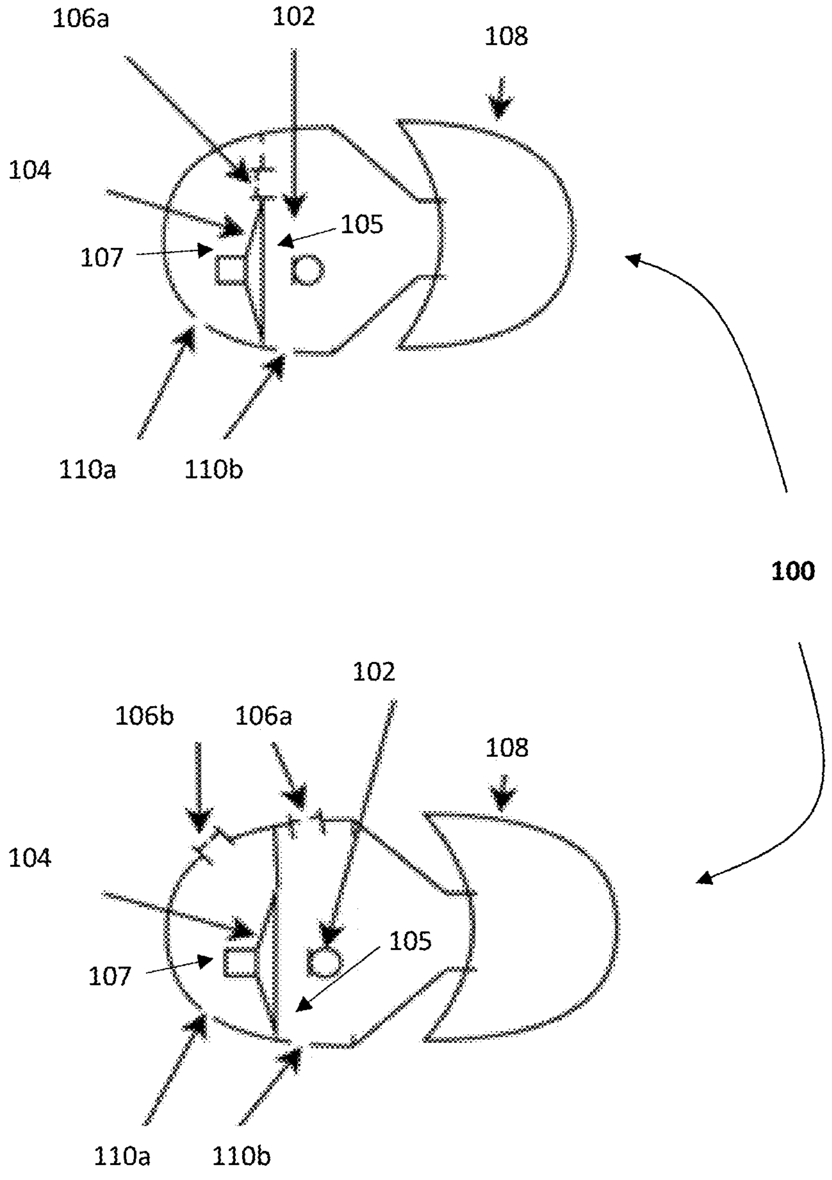
FIG. 1A is a cross-sectional view of an earphone device with at least one active vent.
FIG. 1B is a cross-sectional view of an earphone device with at least two active vents.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Embodiments of the present disclosure relate generally to systems and methods for adapting and controlling active leakage in wearable electronic audio devices, such as headphones or in-ear earphones. In an example, a wearable electronic audio device can include at least one speaker arranged in at least one cavity within the device, and at least one feedback microphone within or proximate the first cavity. The wearable electronic audio device can further comprise at least one active vent in or on the first cavity. The at least one active vent can be controlled to selectively open or close, thereby providing an additional vent path in or through the wearable electronic audio devices, which can alleviate pressure experienced in the ear of a user of the wearable electronic audio device that includes ANC or other noise cancellation features.

The embodiments of the present disclosure disclosed herein are aimed at providing electronic audio devices that allow for mitigation of pressure that builds against the ear drum or ear canal of the user as a result of the closed or sealed aspect design in order to enable a more comfortable user experience. For example, electronic devices disclosed herein which may generally be sensitive to vibrational pressure as a result of user movement, such as air pressure peaks in front of the user eardrum, can be relieved by the usage of dynamic vents.

Additionally, drawbacks traditionally associated with vented electronic audio devices, such as a weak bass response, can be avoided because active vents disclosed herein can be configured to only open for strong air pressure peaks. As an example, increased air pressure in the ear canal due to a footstep of the user can be detected by a sensor (including a feedback microphone sensor, detailed below), trigger an active vent to relieve the increased air pressure during the footstep, and, as soon as the footfall concludes, trigger the active vent to close. Such dynamic ventilation in response to detected disturbances enables superior audio quality and prevents loss of desired low frequency sounds.

Reference now will be made in detail to embodiments of the disclosure, one or more examples of which are illustrated in the drawings. Each example is provided by way of explanation in the disclosure and is not limited thereto. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents. As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Throughout the specification, and in the claims, the term "connected" means a direct electrical, mechanical, or magnetic connection between the things that are connected, without any intermediary devices. The terms "coupled" or "integrated" mean either a direct electrical, mechanical, or magnetic connection between the things that are connected or an indirect connection through one or more passive or active intermediary devices. The term "circuit," "module," or "mechanism" may refer to one or more passive and/or active components that are arranged to cooperate with one another to provide a desired function.

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the disclosure described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

Though particular examples given herein relate to wired or wireless in-ear devices, such as in-earphones, earbuds, or headphones worn on or over at least one ear of a user, features disclosed herein can have applicability to other audio devices that include ANC or other features that can cause or experience pressures and can benefit from venting. These devices can include hearing aids and other medical devices and tools, or other devices that are or include speakers. Accordingly, the examples depicted and discussed herein are not limiting with respect to applications of various features and embodiments of this disclosure.

Referring to FIGS. 1A and 1B, an example in-ear earphone device 100 is depicted. Earphone device 100 can comprise at least one sensor 102, at least one speaker 104 generally defining a first cavity 105 and a second cavity 107, at least one active vent 106*a*, an ear tip 108, and at least one passive vent 110*a*. Wearable audio devices like earphone devices 100 are often referred to as earbuds and are configured to fit partially in the ear of a user, with eartip 108 oriented towards the ear canal. FIG. 1A depicts a cross-sectional view of an earphone device with at least one active vent. FIG. 1B depicts an alternate embodiment of an earphone device with at least a first active vent in and a second optional active vent.

Sensor 102 can comprise a microphone, such as a feedback microphone or a feedforward microphone, an accelerometer, a voice pick up (VPU) sensor, an Inertial Measurement Unit (IMU) sensor, or some other type of sensor suitable to detect at least one relevant sensor modality, as will be appreciated by those having skill in the art upon considering this application in its entirety. In an example used herein, at least one sensor 102 can be a microphone that is configured to detect sound.

Sensor 102 can be arranged on or within earphone device 100 in a variety of ways. In one example, sensor 102 is located on earphone device 100 such that at least one active (sensing) surface of sensor 102 is oriented on an external surface of earphone device 100. In such a configuration, sensor 102 can function as a feedforward microphone that detects background noise external to earphone device 100. Background noise can include environmental noises such as wind, mechanical noises such as airplane or vehicle engines, or general traffic, speech, externally generated music, barking or animal sounds, or other sound or noises that can disrupt or interfere with the sound produced by earphone device 100, such as speech, jaw clenches, gum chewing, and other sounds.

Feedforward microphone sensors can be advantageous in the context of ANC because feedforward microphone sensors can be configured to effectively sense a specific frequency range of noises and isolate the specific frequency range of noises. However, some types of background noises may not be possible to cancel completely or effectively. This can happen if these sounds fall outside the specific frequency range. When this happens, these noises may effectively seem to a user to be amplified due to the successful reduction or cancellation of other background noise. Thus, sounds that fall outside of a designated range of canceled noises may in some cases actually be amplified from the user's experience. Additionally, the effectiveness of feedforward microphone sensors in ANC systems can be limited by the fit of earphone device 100 in each ear of a specific user: if an earbud is loosely fitted inside the ear canal of the user, the perception of background noise cancellation to the user may be reduced.

In another example, sensor 102 can be located in, on, or with an active surface towards a portion of the earphone device 100, such as towards speaker 104 or ear tip 108. In such an orientation, sensor 102 can be configured to act as a feedback microphone to sense an audio signal present in a region closer to the ear canal of the user when earphone device 100 is worn in use. Such an orientation can enable sensor 102 to sense sound emitted by speaker 104 (e.g., music, calls, or any other audio output). In such a configuration, sensor 102 may also be able to detect some external, background noise as well.

Feedback microphone sensors can more accurately capture noise perceived by the user than feedforward microphones. For example, feedback microphone sensors can be configured to sense both varying types of background noise (wind, engine, etc.) and sound generated by speaker 104. Furthermore, regardless of the exact positioning of earphone device 100, the feedback microphone sensor 102 can sense a wide frequency range and therefore a wide variety of noises. Additionally, feedback microphone sensors are generally very effective at sensing low frequency range sounds, such as wind. However, feedback microphone sensors are less able to sense mid to high frequency range sounds. Additionally, because feedback microphone sensors treat sensed speaker sounds (such as incoming music desired by the user) in the same manner as background noise, desired low frequency sounds may sometimes be filtered out with feedback microphones in the context of active noise cancellation.

In some examples, earphone device 100 can include a plurality of sensors 102, with at least one being a feedback microphone and at least another being a feedforward microphone, arranged as discussed above or in other positions and orientations on or in earphone device 100 such that feedback and feedforward functionalities can be utilized or optimized. Whether there is one or a plurality, at least one sensor 102 can provide an output signal related to sensed characteristics or other data.

The at least one speaker 104 is arranged to produce an output audio signal to be heard by a user wearing earphone device 100. In one example, speaker 104 is controlled by processing circuitry (see, e.g., FIG. 3), which can include or interact with an ANC system or circuitry.

ANC can cause some users to perceive increased air pressure in their ears when wearing headphones or earbuds. This can be related to very low-frequency sounds being amplified by the ANC due to compromises that need to be made in the ANC filter design and perceived by the brain as a pressure differential between the inner and outer ear. Therefore, electronic devices disclosed herein (including earphone device 100) disclose ventilation systems and methods to alleviate this pressure.

In FIG. 1A, earphone device 100 comprises at least one active vent 106*a* that is arranged, and can be selectively opened and closed to, reduce air pressure on the ear of a user, such as may be related to ANC or other sources. In one example, active vent 106*a* is located between first cavity 105 and second cavity 107. The placement and orientation of active vent 106*a* can vary in other examples. In operation, active vent 106*a* can be selectively controlled to open and close, thereby providing a vent path on or within earphone device 100.

In examples, active vent 106*a* comprises a micro-electronic systems (MEMS) component, electrodynamic component, or any similar moveable and controllable component that can be selectively opened and closed to function as a vent and provide a vent path while also meeting size and materials requirements within devices like earphone device 100.

In examples, active vent 106*a* can open and close the vent path very quickly, such as within 1 millisecond (ms), for example less than 0.5 ms. Advantageously, operation of active vent 106*a* can be carried out without being audible to the user or otherwise affecting the sound heard by the user, and in fact, the changing or relieving of pressure from the operation of active vent 106*a* may result in some users perceiving audio to be improved.

As depicted in FIG. 1B, some embodiments of earphone device 100 comprise a second optional active vent 106*b*. In this example, first active vent 106*a* is located on first cavity 105 and second active vent 106*b* is located on second cavity 107, with both providing vent paths from within each respective cavity to the environment outside of earphone device 100. In operation, first active vent 106*a* and second active vent 106*b* can be selectively controlled in a related pattern, such as to open and close inversely to one another, sequentially to one another, at the same time, or with only one or the other opening or closing according to certain characteristics of earphone device 100 (e.g., sound sensed by sensor 102, an output audio signal provided by speaker 104).

Embodiments that include at least one active vent 106*a*, 106*b* can provide pressure reduction with respect to the ear of a user and may also provide some audio advantages (e.g., helping to compensate for anticipated low frequency sound losses that can result from the opening of first active vent 106*a*). In yet another example, additional active vents can be included, and the placement and relative arrangement of the plurality of active vents (including first active vent 106*a* and second active vent 106*b*) can vary from the examples of the drawings.

Earphone device 100 also can comprise at least one passive vent 110*a* that can also provide some pressure relief as well as to provide ventilation, cooling, and airflow that may be necessary for the operation of speaker 104 and other components. Passive vent 110*a* is generally located in an external surface of earphone device 100. In the embodiment of FIG. 1A, two passive vents 110*a* and 110*b* are provided, with passive vent 110*a* arranged with respect to first cavity 105 and passive vent 110*b* arranged with respect to second cavity 107. Placement options for passive vents 110*a*, 110*b* may generally be limited due to size constraints of earphone device 100. Size, placement, and orientation of any or all active vents 106*a*, 106*b* and passive vents 110*a*, 110*b* is limited by the space available in earphone device 100, which must be sized to fit securely and comfortably in the ear of a user, size.

Active vent 106*a*, 106*b* and passive vents 110*a*, 110*b* each can comprise at least one aperture and optionally an acoustic membrane of suitable material to control the acoustic impedance of the opening. Active vents 106*a*, 106*b* generally have an opening of 1 square millimeter $(mm)^2$. Passive vent 110*a*, 110*b* size range can be between 0.1 $mm^2$ and 3 $mm^2$. For headphone device 200, passive vent sizes can be larger in order to compensate for larger corresponding active vents.

Figure 2A:
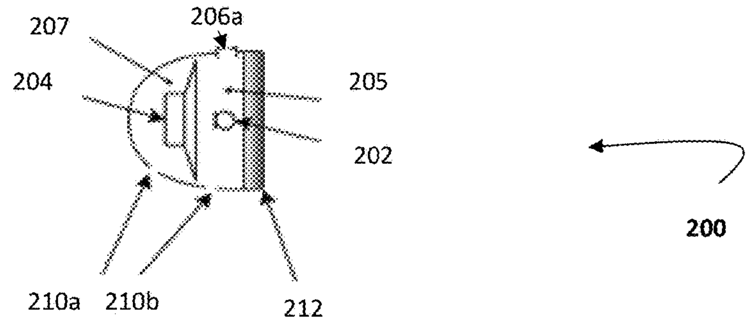
FIG. 2A is a cross-sectional view of a headphone device with at least one active vent.
Figure 2B:
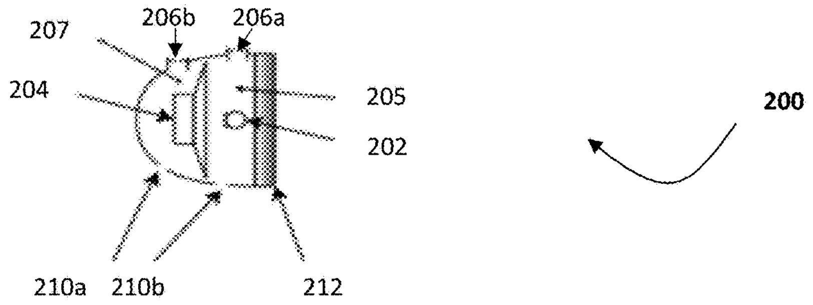
FIG. 2B is a cross-sectional view of a headphone device with at least two externally located active vents.
Figure 2C:
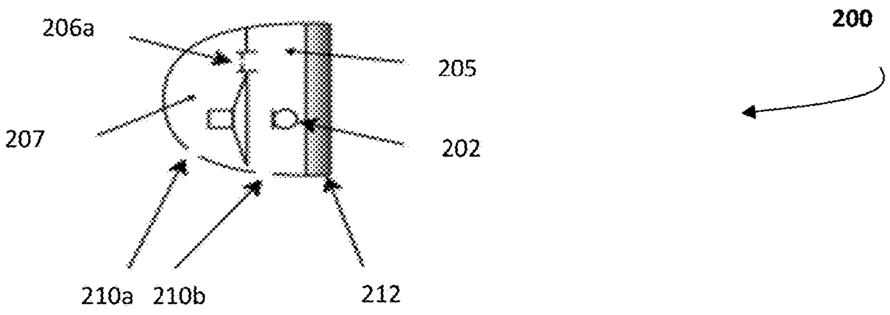
FIG. 2C is a cross-sectional view of a headphone device with at least one internal active vent.

Referring to FIGS. 2A-2C, an example headphone device 200 is depicted. In one example, headphone device 200 fits on the ear of a user. In another example, headphone device 200 fits over the ear of a user. Though only a single headphone device 200 is depicted, headphone device 200 can comprise one of a pair of headphone devices 200 that make up a set of headphones. Headphone device 200 also can be singular, such as may be used on some types of headsets. Headphone device 200 generally comprises at least one sensor 202, at least one speaker 204, at least one active vent 206*a*, 206*b*, a first cavity 205, a second cavity 207, at least one passive vent 210*a*, 210*b*, and an ear cushion 212 that contacts or covers the ear of a user in use. These components, their reference numerals incremented by 100 with respect to the embodiments of FIGS. 1A and 1B (e.g., speaker 104 and speaker 204; first cavity 105 and first cavity 205) generally are similar or the same unless otherwise discussed herein. Thus, description and discussion of these components will not be repeated herein.

Ear cushion 212 can be made of a material or combination of materials that provide a sufficient seal around or on the ear of the user while also being comfortable, such as memory foam covered by a fabric or by leather. As headphone device 200 is configured to be worn on or over the ear of the user, sound may enter in, or escape from, around or through ear cushion 212 of headphone device 200. For example, vibrational pressures through natural movements of the user's body, such as for example footsteps, can cause headphone device 200 to move on the head or ear of the user, or the hair or glasses of a user can affect the efficacy of the fit and seal of ear cushion 212. Additionally, movement of the jaw of a user while talking can alter the fit of headphone device 200, causing changes in the acoustic experience. Thus, pressure on the ears of the user can vary, and use of ANC in devices like headphone device 200 also can create pressures. Embodiments incorporating at least one active vent 206*a*, 206*b* therefore can provide pressure reducing features that improve the user experience.

Figure 3:
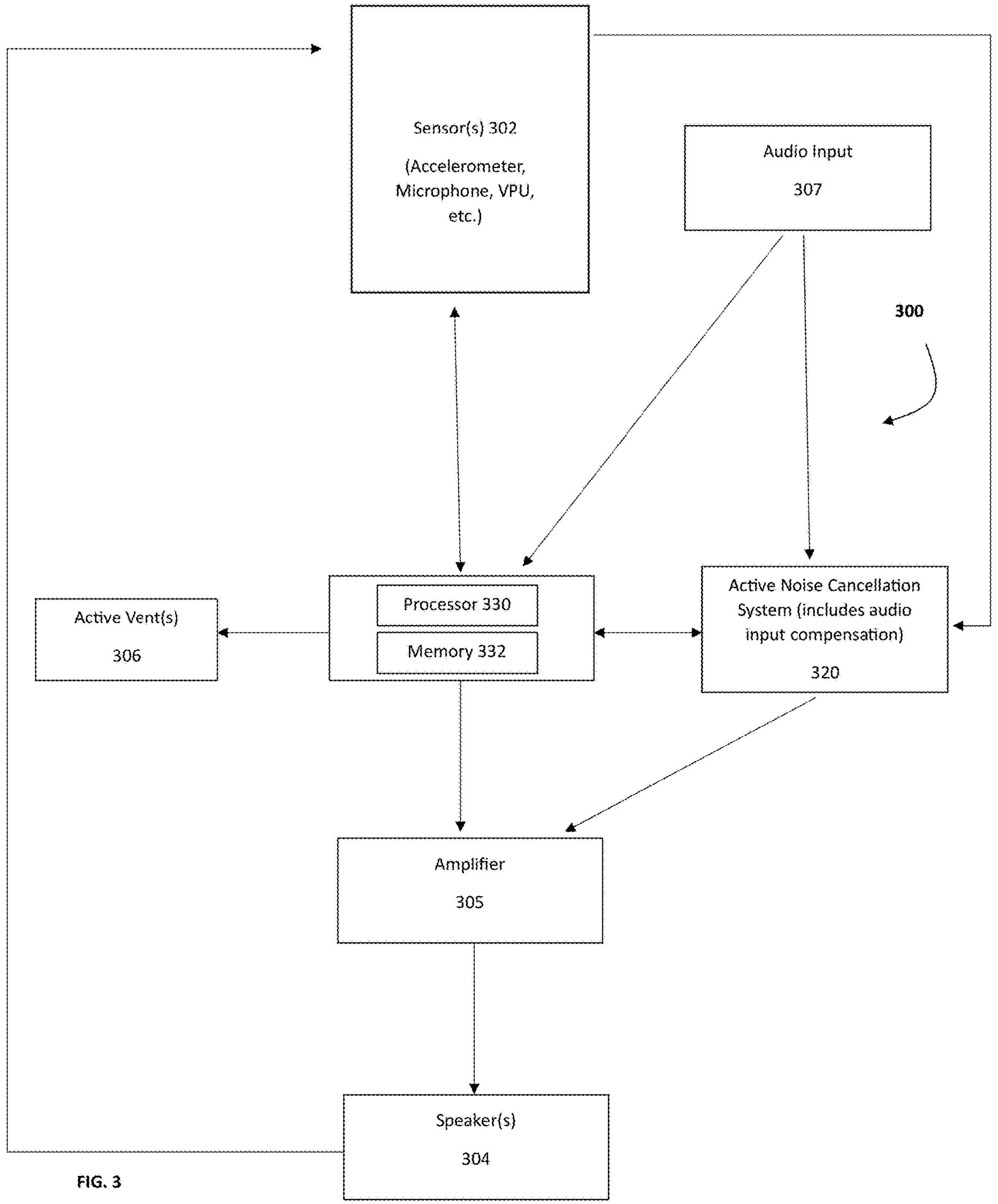
FIG. 3 is a block diagram of a system for configuring one or more features of an active vent based on detected input.

Referring to FIG. 3, an example block diagram of an active leakage system 300 is depicted. System 300 is a functional depiction of various components of, e.g., in-ear earphone device 100, headphone device 200, or another wearable or other audio device, here referred to generally as device 300. The various components of system 300 can control active vents 106*a* 206*a* (e.g., timing, whether a particular active vent is open or closed, how a plurality of active vents are opened and controlled relative to one another). Here again, reference numerals for like components and features are generally incremented by 100 (e.g., speaker 104, 204, 304; sensor(s) 102, 202, 302; etc.). System 300 can be configured to receive audio input 307 that is not necessarily detected by sensors 302.

System 300 comprises one or more sensors 302 as discussed herein above. Though these sensor modalities are depicted for illustrative purposes in FIG. 3, in other examples one or more can be omitted, or additional sensors can be included. System 300 also includes at least one speaker 304, at least one active vent 306, an amplifier 305, an ANC system or circuitry 320 inclusive of audio input compensation, a processor 330, and memory 332. In some embodiments, ANC system or circuitry 320 is part of or implemented by processor 330.

Processor 330 can be any programmable device that accepts digital or analog data as input, is configured to process the input according to instructions or algorithms and provides results as outputs. In an embodiment, processor 330 can be a central processing unit (CPU), a very low latency digital signal processor (DSP), or a microcontroller or microprocessor configured to carry out the instructions of a computer program. Processor 330 is therefore configured to perform at least basic arithmetical, logical, and input/output operations.

Memory 332 can comprise volatile or non-volatile memory as may be required by processor 330 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory (ROM), flash memory, ferroelectric RAM, hard disk, or optical disc storage, for example. The foregoing lists in no way limit the type of memory that can be used, as these embodiments are given only by way of example and are not intended to limit the scope of the present disclosure.

In examples, each sensor 302 can be configured to continually monitor for a respective incoming or occurring sensor modality (e.g., sound, movement, orientation). Each sensor 302 then can provide a sensor data signal to processor 330.

In one example, processor 330 can process received sensor data signals in accordance with an associated acoustic scene and operating mode, save or retrieve related information to or from memory 332, in interaction with ANC system 320. In another example, processor 330 can process received audio input 307 in accordance with an associated acoustic scene and operating mode, save or retrieve related information to or from memory 332, in interaction with ANC system 320. Ultimately, processor 330 can provide a control signal to amplifier 305 to produce or adjust an audio output signal to be emitted via speaker 304.

ANC system 320 can provide selections, programming, algorithms, or information (alone or in concert with processor 330) to generate an anti-noise signal or a signal to overcome the passive attenuation of headphone/earphone (transparency mode) or sound according to the sensor data and the determined acoustic scene and operating mode. Anti-noise sound can be considered a subtraction of extraneous background sound detected by sensor 302. In one example, the subtracted sound is air pressure that is an inverse of the detected extraneous background sound. ANC system 320 can provide an anti-noise signal to processor 330 and to amplifier 305 in order to minimize overall latency.

ANC system 320 can generate, or cause speaker 304 to generate, anti-noise sound based on acoustic scene classification and operating mode determined by processor 330. For example, anti-noise sound generated by ANC system 320 when device 300 is operating in transparency mode can be different from anti-noise sound generated by ANC system 320 when the disclosed electronic device is operating in active noise cancellation. Similarly, if an acoustic scene is identified as outdoors on a windy day, ANC system 320 can generate anti-noise sound differently from if the acoustic scene is a relatively quiet indoor environment.

For example, if processor 330 processes sensor data and determines that the acoustic scene is inside, then processor 330 can transmit a control signal to ANC system 320 to generate anti-noise sound for a specific frequency range based in part on the identified acoustic scene. In another example, if a user has selected, with a user-controllable setting, the acoustic scene to be inside, then processor 330 can transmit a control signal to ANC system 320 to generate anti-noise sound for a specific frequency range based in part on the identified acoustic scene. Alternately or additionally, processor 330 can filter sensor data based on determined operating mode and acoustic scene using a combination of filters.

After processor 330 receives a processed audio signal, such as for example a music compensated feedback microphone signal, from ANC system 320, processor 330 processes the audio signal with the sensor data. If the processed data results in a frequency range or weighted loudness level above a predefined threshold (as further described below in FIG. 4), processor 330 transmits a trigger signal to active vent 306 to open for a duration of time based on the frequency level of the sampled data. If, however, the sampled frequency level is below a predefined threshold, processor 330 transmits a control signal to the active vent 306 to remain closed. In alternate embodiments, if the sampled frequency level is within a specified frequency range below the threshold, processor 330 transmits a control signal to the active vent 306 to be in a partially open state.

In a hybrid ANC system 320, which utilizes at least a combination of feedforward and feedback microphone sensors, speaker 304 can generate an audio output signal based on sampled and processed sensor data to provide audio output sound according to a user preference. In systems where the only sensor type is a feedforward microphone sensor, speaker 304 can generate an audio output signal based on combination of the sampled sensor data and other desired audio signals processed by processor 330 (such as the user's desired choice of music) to provide the user with an optimized listening experience.

In embodiments, processor 330 can be within or outside a housing of device 300. For example, some or all of processor 330 can operate in and on device 300, or as part of a remote user device (e.g., a smartphone, smart watch, tablet, computer, or other computing device), or in the cloud or on a remote server in wired or wireless communication with device 300.

In embodiments, electronic devices disclosed herein include processor 330 configured to control one or more features of device 300 disclosed herein based on data from sensor 302. Processor 330 and ANC system 320 can comprise one or more engines. An "engine" as referred to herein can be any hardware or software that is constructed, programmed, configured, or otherwise adapted to autonomously carry out a function or set of functions. Engine is herein defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations and should generally not be limited to any particular implementation exemplified herein, unless such limitations are expressly called out.

In embodiments, each engine can itself be composed of more than one sub-engine, each of which can be regarded as an engine in its own right. Moreover, in the embodiments described herein, processor 330 corresponds to defined operation, wherein operation can be determined without need for additional manual input from the user; however, it should be understood that in other contemplated embodiments, functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Embodiments of the present disclosure can optionally implement artificial intelligence (AI) or machine learning (ML) to better process and recognize patterns related to detected sensor data. Patterns in sensor data for electronic devices disclosed herein or any electronic device comprising functional equivalent of earphone device 100 or headphone device 200 can be extracted manually or automatically by machine learning approaches such as, for example, convolutional neural networks, to produce training data that can be compared to detected sensor data. Accordingly, the ML model can be efficiently applied to supervised (labeled) detected sensor data by processor 330. In embodiments, unlabeled (unsupervised) force data can be used although accuracy and precision of the ML model will perform comparatively worse without additional training.

With sufficient training, the ML model can better recognize patterns in detected sensor data, including acceptable associated parameter levels for pressure and frequency with respect to detected sensor data. In embodiments, the comparison process can be accomplished by computing similarity metrics using correlation or machine learning regression algorithms. This analysis can be improved during operation by inclusion of feedback loops directed to classifying sensor data parameter patterns for particular users. Alternate embodiments can include analyzing gestures pertaining to electronic devices including functional equivalents of earphone device 100 and headphone device 200, such as for example an electronic device, where a "take off device" gesture is above a certain threshold. As more comparisons between received data and training data are made, feedback of the accuracy of previous comparisons can be tracked to better recognize future force data patterns. For example, ANC system 320 can be implemented using the ML model.

Figure 4:
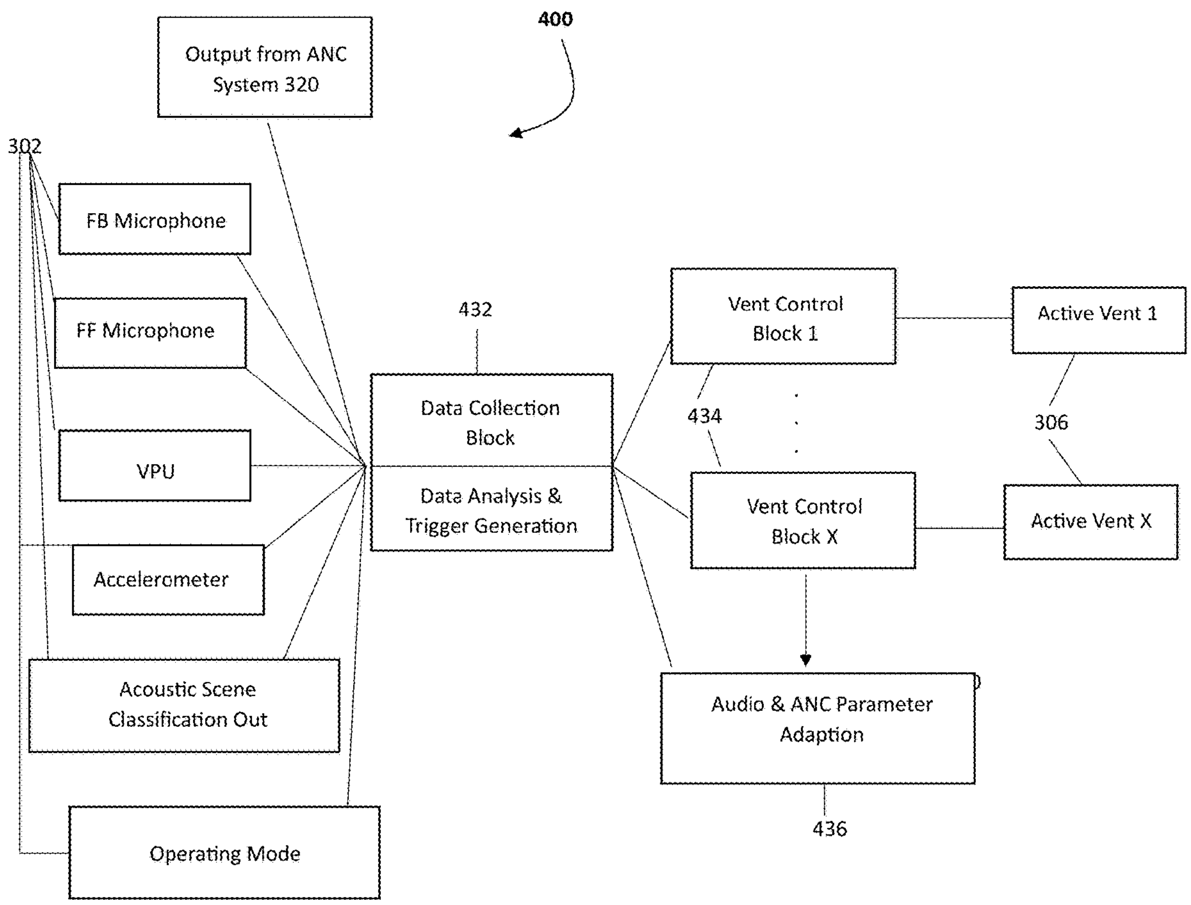
FIG. 4 is a block diagram of a system comprising at least a plurality of sensors, a data collection block, a vent control block, and an active vent.

Referring to FIG. 4, an example flow diagram of a vent control system 400 is depicted. System 400 is a functional depiction of various components of system 300 and will use corresponding reference numerals for consistency.

System 400 comprises one or more sensors 302 as discussed herein above. Though these sensor modalities are depicted for illustrative purposes in FIG. 4, in other examples one or more can be omitted, or additional sensors can be included. Though not exclusively sensor modalities, at least sensors 302 and output from the ANC system 320 can include acoustic scene classification output (which can relate to signals from one or more sensors, or a user setting or selection) and an operation mode setting or selection (such as ANC, transparency, voice/call, music, etc.).

Signals, settings, data, music compensated FB signal sensed by sensor 302 and outputted by ANC System 320 and other relevant information is communicated to a data collection block 432, which carries out data analysis and active vent trigger generation. Accordingly, data collection block 432 can be implemented in whole or in part by processor 330 in examples.

In an example that comprises a plurality of active vents 306, control signals from data collection block 432 are communicated to each of a plurality of vent control block 434. The vent control blocks work in a similar way like classic audio dynamic compressors—with attack time, hold time and release time parameters, threshold levels etc. The whole timing of the opening and closing process of the active vent is described here.

In embodiments, when multiple active vents are used, as is depicted in the example of FIG. 4, each vent can have its own corresponding vent control block in order to allow for greater control and flexibility over opening and closing of each vent. Alternately, a single vent control block can be configured to control a plurality of active vents. The overarching data control block can be configured to continually collect sensor data and create a trigger signal for the vent control block(s) based on collected data. Additional speakers can also be included to compensate for lost frequency due to opening of an active vent.

While an active vent is open, for example during a movement of the headphone or during a footstep of the user, the audio playback low frequency response can be degraded by the additional opening on the front cavity of the loudspeaker. To equalize this out, a dynamic equalizer can boost low frequencies in the audio signal during the open phase of the active vent. In the same manner the filters of the active noise cancellation can be adapted to the different acoustic situation while the vent is open, hence the inclusion of audio and ANC parameter adaptation block 436.

Figure 5:
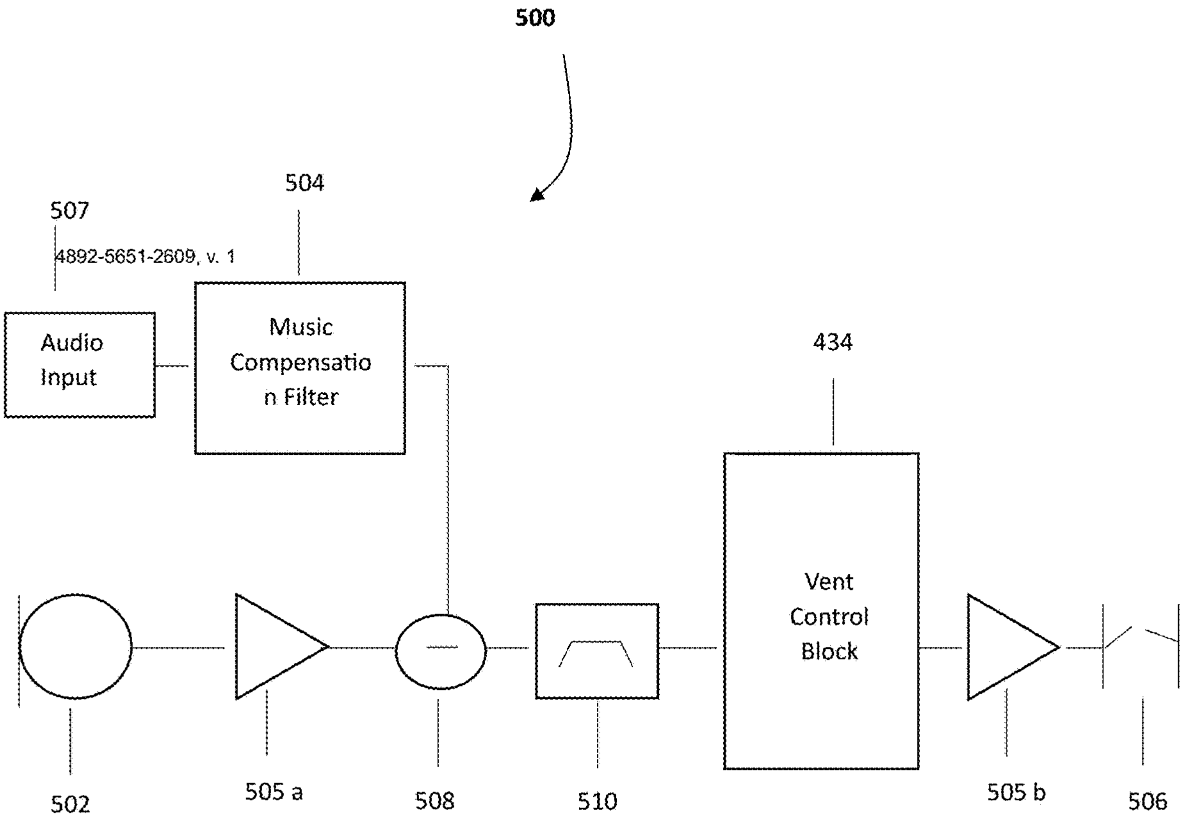
FIG. 5 is a flow chart of a system comprising at least a detection circuit, a bandpass filter, and an active vent.

Another depiction of active vent circuitry is shown in FIG. 5. As can be seen from FIG. 5, audio input 507 is fed through a compensation filter 504, and this signal is then combined with an amplified signal from a feedback microphone 502, where the signal sensed by feedback microphone 502 is amplified by amplifier 505*a*. The compensation filter 504 is designed in a way that an incoming audio signal that is also played back directly through the speaker and hence also is sensed by the feedback microphone 502 is subtracted (at 508) from the microphone signal. In general terms, this indicates that the bandpass filter 510 input only gets the pure feedback microphone signal without any music signal that could disturb the combined signal. This combined signal can then be bandpass filtered using bandpass filter 510 and provided to a vent control block 434. Vent control block 434 can then control the active vent 506 via a control signal through a power amplifier 505*b* and a speaker.

In embodiments, ANC system 320 can be configured to provide a music compensated first sensor signal. In alternate embodiments, ANC system 320 can be configured to provide a music compensated first sensor signal and an ANC signal.

Thus, in embodiments, a system is built around a feedback microphone sensor inside the speaker front cavity or close to the ear canal, a data collection block, a vent control block, and an active vent. Embodiments are generally configured to target in-ear headphones, and as such be lightweight and therefore include smaller batteries and speakers, and overall be encompassed within a slim design. The design needs appear to contradict with acoustic needs of such audio devices, where big speakers can enhance low frequency performance and enhance an acoustically open design, but can also occupy greater space and therefore are required to be housed in larger audio devices, which can detract from user experience. Thus, there is a marked need to gravitate toward use of smaller electronic components, such as smaller speakers, from wearable audio devices.

Generally, smaller speakers for wearable audio devices may naturally experience greater opportunities for active leakage. Therefore, prevention measures are needed to guard against active leakage. Smaller sized speaker can be "sealed", such that the naturally occurring space between a first cavity between a speaker membrane and user ear canal is designed to be decreased. Generally, sealing occurs by using cushiony materials through which sounds is less likely to escape. In over-ear headphones, prevention of active leakage by various means, including sealing, can be especially crucial as a user of over-ear headphones may be especially susceptible to experiencing vibrational pressures, such as their own footsteps, through the front cavity of the wearable audio device.

In examples, an active vent such as a MEMS device disclosed herein, can be configured to open and close based on when user starts and stops running or walking. Generally, active vents are permanently opened or closed. A feedback microphone sensor, with a strong embedded detection circuit and optional additional sensors, can detect footsteps in various embodiments.

Thus, this disclosure is directed to wearable audio devices, including in-ear audio devices and over-ear headphones. At least one, though in some embodiments a plurality, of active vents can be used.

In examples, the wearable audio devices can include a silicon ear piece. A feedback microphone sensor can be configured to measure a sound pressure level in front of a speaker, the signal can then be transmitted to the ANC circuit for further processing. Passive vents can be configured along the wearable audio device to offer pressure relief such as atmospheric pressure relief. Passive vents are often configured in parallel with the at least one active vents. Passive vents are configured to remain open and often include an acoustic membrane.

A music compensation circuit can be used, which can be added to the data collection block such that desired music played by user is not affected.

In some embodiments, additional sensors can be added for scene classification, in addition to all of the above. Also, other sounds in addition to footsteps, such as tapping, can be detected. Generally, all vibrations throughout the user body can be captured and addressed via the active vent(s). The frequency is generally low, such as below 100 Hz.

Additional speakers can be used for additional fine-tuning, and an active speaker can be included which can be configured to compensate for any lost frequency which happens when an active vent is opened.

If a dynamic low frequency pressure peak builds up in the speaker front cavity between speaker and eardrum, the pressure peak can be detected by a feedback microphone sensor, followed by a bandpass filter to suppress higher and subsonic frequencies. In case this trigger signal exceeds the threshold level in the vent control block, the active vent opens the front speaker cavity to release the pressure. The attack, hold, and release parameters define how fast the vent opens, how long it stays open, and how fast the vent closes.

For example, in the case of footsteps, the active vent will only open during the impact of the foot that creates an uncomfortable pressure peak in front of the ear drum. As soon as the pressure signal at the feedback microphone drops below the threshold, the active vent closes according to hold and release times. The music signal low frequencies are only reduced for the same period where the footstep happens. This reduction may be masked by extraneous mechanical noise of the footstep. In a more complex system, low frequency reductions can be equalized out by using an adaptive equalizer (EQ).

When the active vent is open, for example during a movement of the headphone or during a footstep of the user, the music playback low frequency response can be degraded by the additional opening on the front cavity of the loudspeaker. To equalize this out a dynamic EQ can boost low frequencies in a desired music signal during the open phase of the active vent. In the same manner the filters of the active noise cancellation can be adapted to the different acoustic situation while the active vent is open.

The active vent can be located at the speaker first cavity and/or between first and second cavity. Additionally, an active vent can be located at the speaker back housing to compensate for low frequency music playback losses that the opening of the first cavity could cause.

The feedback microphone sensor can be analog or digital. In a wearable audio device with active noise cancellation, the feedback microphone sensor of the ANC system can be reused as a data source for the data collection block. Other sensors can also be configured to deliver relevant information to the data collection block. Alternative sensors include accelerometers, VPU sensors, IMU sensors, etc.

The data collection block collects sensor data or already processed data, such as for example from an acoustic scene classifier, and creates a trigger signal for the vent control block. Signal processing is generally extremely efficient as the entire signal processing chain can reuse the fast DSP that is in place to also calculate ANC. The overall latency from input to output should be below 1 ms.

The vent control block controls the threshold above which the vent should actively open as well as parameters related to timing. The timing parameters can be adjusted similarly to timing parameters of an audio compressor or limiter, including attack, hold and release times.

The active vent can be a MEMS, electrodynamic or similar vent which can vary the acoustically relevant area based on a control signal. The active vent can be configured to seamlessly change the open area and react within milliseconds of a control signal change. Furthermore, the active vent should open or close without generating significant additional noise.

Multiple data sources can be used and can be analog or digital, sensor data from multiple sensors like microphones and accelerometers can be combined to get a reliable input for the data collection block. Information on the operating mode of the wearable audio device and information on the current use case and/or environment delivered by an acoustic scene classification can be considered as input for the data collection block.

This disclosure includes the following clauses:

Clause 1: A wearable audio device comprising: at least one speaker; a first sensor configured to sense sound related to the at least one speaker and provide a first sensor signal; a second sensor configured to sense sound external to the wearable device and provide a second sensor signal; active noise cancellation (ANC) circuitry configured to provide a third signal and a fourth signal, wherein the third signal is a music compensated first sensor signal; at least one active vent; and at least one processor configured to: receive the first sensor signal, the second sensor signal, and the third signal to determine whether a trigger threshold is met, and if the trigger threshold is met, send a control signal to the at least one active vent to cause the at least one active vent to open or close.

Clause 2: The wearable device of clause 1, wherein the ANC circuitry is configured to provide a fourth signal that is an ANC signal, and wherein the at least one processor is further configured to receive the fourth signal and process the first sensor signal, the second sensor signal, the third signal, and the fourth signal, to determine whether a trigger threshold is met.

Clause 3: The wearable audio device of clause 1, wherein the wearable audio device comprises a first cavity on an output side of the at least one speaker and a second cavity on a side of the at least one speaker opposite the output side, and wherein the wearable audio device comprises a first active vent in the first cavity and a second active vent in the second cavity.

Clause 4: The wearable audio device of claim 1, wherein the wearable audio device comprises a first cavity on an output side of the at least one speaker and a second cavity on a side of the at least one speaker opposite the output side, and wherein the at least one active vent is arranged between the first cavity and the second cavity.

Clause 5: The wearable audio device of clause 1, wherein the device further comprises a plurality of sensors that comprise any of a feedback microphone sensor, a feedforward microphone sensor, an accelerometer sensor, a voice pick up (VPU) sensor, or an Inertial Measurement Unit (IMU) sensor.

Clause 6: The wearable audio device of clause 1, wherein the processor is within the ANC circuitry.

Clause 7: The wearable audio device of clause 1, wherein the processor is remote from the ANC circuitry.

Clause 8: The wearable audio device of clause 1, wherein the active vent opens and closes within 10 milliseconds of transmission of the control signal from the processor.

Clause 9: The wearable audio device of clause 1, further comprising a plurality of speakers.

Clause 10: The wearable audio device of clause 1, wherein at least one of the first signal, second signal, or third signal, is attenuated by a bandpass filter.

Clause 11: The wearable audio device of clause 1, further comprising a power amplifier.

Clause 12: A method for dynamically regulating active leakage in a wearable audio device, comprising: providing at least one active vent near a speaker in the wearable audio device; providing at least one sensor and circuitry in the wearable audio device that are arranged to provide at least one output signal related to sound sensed related to the at least one speaker or sound sensed external to the wearable audio device; and providing at least one processor configured to control an opening or a closing of the at least one active vent based on the at least one output signal.

Clause 13: The method of clause 12, wherein providing at least one sensor and circuitry further comprises providing active noise cancellation (ANC) circuitry.

Clause 14: The method of clause 12, further comprising: determining, via the at least one processor, whether a trigger threshold is met by processing the at least one output signal; and sending, via the at least one processor, a control signal to the at least one active vent to cause the at least one active vent to open or close if the trigger threshold is met.

Clause 15: The method of clause 12, wherein providing at least one sensor further comprises providing at least one of a feedback microphone sensor, a feedforward microphone sensor, an accelerometer sensor, a voice pick up (VPU) sensor, or an Inertial Measurement Unit (IMU) sensor.

Clause 16: The method of clause 12, wherein the wearable audio device is one of an in-ear earphone device, an over-ear headphone device, or an on-ear headphone device.

Clause 17: The method of clause 12, further comprising causing the at least one active vent to open or close within 10 milliseconds of transmission of the at least one output signal from the processor.

Clause 18: The method of clause 12, further comprising providing at least one bandpass filter to attenuate all or a portion of the at least one output signal.

Clause 19: The method of clause 12, further comprising providing at least one power amplifier to amplify all or a portion of the at least one output signal.

Clause 20: An audio device comprising: at least one speaker; at least one sensor configured to sense sound related to the at least one speaker and to sense sound external to the wearable device and provide at least one sensor signal; active noise cancellation (ANC) circuitry configured to provide at least one ANC signal related to at least one of the sensed sound related to the at least one speaker or the sensed sound external to the wearable device; at least one active vent; and at least one processor configured to control an opening or a closing of the at least one active vent based on the at least one sensor signal and the at least one ANC signal.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A wearable audio device comprising:

at least one speaker;

a first sensor configured to sense sound related to the at least one speaker and provide a first sensor signal;

a second sensor configured to sense sound external to the wearable audio device and provide a second sensor signal;

active noise cancellation (ANC) circuitry configured to provide a third signal, wherein the third signal is a music compensated first sensor signal;

at least one active vent; and at least one processor configured to:

receive the first sensor signal, the second sensor signal, and the third signal to determine whether a trigger threshold is met, and if the trigger threshold is met, send a control signal to the at least one active vent to cause the at least one active vent to open or close.

2. The wearable audio device of claim 1, wherein the ANC circuitry is configured to provide a fourth signal that is an ANC signal, and wherein the at least one processor is further configured to receive the fourth signal and process the first sensor signal, the second sensor signal, the third signal, and the fourth signal to determine whether the trigger threshold is met.

3. The wearable audio device of claim 1, wherein the wearable audio device comprises a first cavity on an output side of the at least one speaker and a second cavity on a side of the at least one speaker opposite the output side, and wherein the wearable audio device comprises a first active vent in the first cavity and a second active vent in the second cavity.

4. The wearable audio device of claim 1, wherein the wearable audio device comprises a first cavity on an output side of the at least one speaker and a second cavity on a side of the at least one speaker opposite the output side, and wherein the at least one active vent is arranged between the first cavity and the second cavity.

5. The wearable audio device of claim 1, wherein the wearable audio device further comprises a plurality of sensors that comprise any of a feedback microphone sensor, a feedforward microphone sensor, an accelerometer sensor, a voice pick up (VPU) sensor, or an Inertial Measurement Unit (IMU) sensor.

6. The wearable audio device of claim 1, wherein the processor is within the ANC circuitry.

7. The wearable audio device of claim 1, wherein the processor is remote from the ANC circuitry.

8. The wearable audio device of claim 1, wherein the at least one active vent opens and closes within 10 milliseconds of transmission of the control signal from the processor.

9. The wearable audio device of claim 1, further comprising a plurality of speakers.

10. The wearable audio device of claim 1, wherein at least one of the first sensor signal, the second sensor signal, or the third signal is attenuated by a bandpass filter.

11. The wearable audio device of claim 1, further comprising a power amplifier.

12. A method for dynamically regulating active leakage in a wearable audio device, comprising:

providing at least one active vent near at least one speaker in the wearable audio device;

providing at least one sensor and circuitry in the wearable audio device that are arranged to provide at least one output signal related to sound sensed related to the at least one speaker or sound sensed external to the wearable audio device, wherein the at least one output signal is music compensated; and providing at least one processor configured to control an opening or a closing of the at least one active vent based on the at least one output signal.

13. The method of claim 12, wherein providing the at least one sensor and circuitry further comprises providing active noise cancellation (ANC) circuitry.

14. The method of claim 12, further comprising:

determining, via the at least one processor, whether a trigger threshold is met by processing the at least one output signal; and sending, via the at least one processor, a control signal to the at least one active vent to cause the at least one active vent to open or close if the trigger threshold is met.

15. The method of claim 12, wherein providing the at least one sensor further comprises providing at least one of a feedback microphone sensor, a feedforward microphone sensor, an accelerometer sensor, a voice pick up (VPU) sensor, or an Inertial Measurement Unit (IMU) sensor.

16. The method of claim 12, wherein the wearable audio device is one of an in-ear earphone device, an over-ear headphone device, or an on-ear headphone device.

17. The method of claim 12, further comprising causing the at least one active vent to open or close within 10 milliseconds of transmission of the at least one output signal from the processor.

18. The method of claim 12, further comprising providing at least one bandpass filter to attenuate all or a portion of the at least one output signal.

19. The method of claim 12, further comprising providing at least one power amplifier to amplify all or a portion of the at least one output signal.

20. An audio device comprising:

at least one speaker;

at least one sensor configured to sense sound related to the at least one speaker and to sense sound external to the audio device and provide at least one sensor signal;

active noise cancellation (ANC) circuitry configured to provide at least one ANC signal related to at least one of the sensed sound related to the at least one speaker or the sensed sound external to the audio device;

at least one active vent; and at least one processor configured to control an opening or a closing of the at least one active vent based on the at least one sensor signal and the at least one ANC signal.

* * * * *